2,789,983
Patented Apr. 23, 1957

2,789,983
RECOVERY OF CYCLOSERINE

Roger L. Harned, Terre Haute, Ind., assignor to Commercial Solvents Corporation, Terre Haute, Ind., a corporation of Maryland No Drawing. Application August 3, 1954,
Serial No. 447,639

8 Claims. (Cl. 260—307)

My invention relates to the antibiotic cycloserine and more particularly it relates to a process for the recovery of cycloserine from the nutrient medium in which it is produced and to water-insoluble metal salts of cycloserine.

The antibiotic cycloserine is a broad spectrum antibacterial agent possessing activity against both gram-negative and gram-positive bacteria including mycobacteria such as *Mycobacterium ranae*. The new antibiotic is produced by a species of microorganism which has been designated *Streptomyces orchidaceus*. The antibiotic is an amphoteric substance possessing weakly acidic and weakly basic groups, the antibiotic being very soluble in water, partially soluble in glycols, isopropyl alcohol, methanol, ethanol, and acetone. The material is insoluble in hexane, benzene, chloroform, ether, petroleum ether, dioxane, 1-butanol, ethyl acetate, and ethylene dichloride. The antibiotic melts with decomposition at about 153° C., and hydrolyzes at 140° C. with 1 N hydrochloric acid. Cycloserine has the following structural formula:

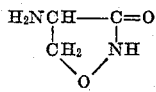

In the production of the new antibiotic cycloserine, the microorganism *Streptomyces orchidaceus* is cultivated in a nutrient medium. A medium containing a suitable source of protein and a suitable source of carbohydrate is satisfactory for cycloserine production, air being supplied to the medium which is incubated at a temperature between about 20 and 30° C.

The antibiotic cycloserine is fully described along with the method of producing it in United States patent application Serial No. 424,612, filed April 21, 1954, by Roger L. Harned and Eleanore LaBaw.

I have now discovered a method for the recovery of the antibiotic cycloserine from impure aqueous solutions thereof including nutrient media in which it is produced. My new method is convenient, economical, and efficient in recovering good yields of the antibiotic either in an amorphous or crystalline form.

My new process for the recovery of cycloserine from impure aqueous solutions thereof including nutrient media in which it is produced, involves essentially adsorption of the antibiotic from the impure aqueous solution on a strong basic anion exchange resin in the hydroxide form, elution of the antibiotic from the anion exchange resin, formation of an intermediate water-insoluble metal salt of cycloserine, decomposition of the metal salt, and solution of the antibiotic followed by freeze-drying under vacuum to obtain the antibiotic in amorphous form or crystallization of the antibiotic by addition of a water-miscible solvent to an aqueous solution of the antibiotic.

In carrying out my invention, I first filter or otherwise clarify the impure aqueous solution of cycloserine. I prefer to filter and decolorize the solution with activated char. As indicated above, I then adsorb the antibiotic from the aqueous solution on a strong basic anion exchange resin in the hydroxide form. Suitable strong basic anion exchange resins which can be employed include Dowex-1 (divinylbenzene type strongly basic anion exchange resin), Dowex-2 (divinylbenzene type strongly basic anion exchange resin), both produced by Dow Chemical Company, Midland, Michigan, and Amberlite XE-75 (porous modified amine strongly basic anion exchange resin), Amberlite IRA-400 (modified amine strongly basic anion exchange resin), Amberlite IRA-410 (modified amine strongly basic anion exchange resin), produced by Rohm and Haas Company, Philadelphia, Pennsylvania.

Following adsorption of the antibiotic on the strong basic anion exchange resin, I then elute the antibiotic from the resin employing an aqueous solution of a material having an anion capable of displacing cycloserine from the resin, such anion being other than OH-. Suitable eluting materials include water soluble sulphates, chlorides, acetates, formates, phosphates, citrates, oxalates, etc. and sulfuric acid, hydrochloric acid, acetic acid, formic acid, phosphoric acid, citric acid, oxalic acid, etc. The process for adsorbing cycloserine on the anion exchange resin is within the skill of the art, a convenient method being to pass the aqueous solution of the antibiotic through a column containing the resin until the maximum amount of the antibiotic has been adsorbed on the resin as indicated by a break-through of the antibiotic which is then found in increasing quantities in the run-off from the column. In eluting the antibiotic from the resin, the eluting agent in aqueous solution is passed through the column until the antibiotic has been completely eluted as indicated by decreasing amounts of and finally a lack of the antibiotic in the eluate run-off.

Following elution of the antibiotic from the anion exchange resin, I decolorize the eluate with activated carbon if necessary and I then precipitate the antibiotic from the aqueous solution as an insoluble metal salt. In carrying out this step of my process, I add to the aqueous solution of cycloserine a water-soluble salt of a metal which forms an insoluble salt with the antibiotic thus precipitating the metal salt of cycloserine. Prior to addition of the metal salt to the cycloserine solution, I adjust the pH of the cycloserine solution to a value between about 5.5 and 9.0 and readjust the pH to a value within this range after addition of the metal salt. I prefer to employ a pH of 6.5. At a pH below 5.5, very little insoluble metal salt of cycloserine is formed while at a pH above 9.0 excessive amounts of metal hydroxide are formed upon addition of the water-soluble metal salt to the aqueous solution of cycloserine. Metals which have been found to form insoluble salts with the antibiotic cycloserine include silver, copper, mercury, zinc, lead, aluminum, and cobalt, and consequently water-soluble salts of these metals can be added to an aqueous solution of the antibiotic cycloserine, and the antibiotic will precipitate as a salt of the metal employed. Suitable water-soluble salts of the various metals mentioned above include silver nitrate, cupric chloride, copper sulphate, mercuric acetate, zinc nitrate, zinc sulphate, lead acetate, lead nitrate, aluminum chloride, cobalt nitrate, cobalt chloride, cobalt sulfate, etc.

It is, of course, obvious that insoluble metal salts of the antibiotic cycloserine can be precipitated from any aqueous solution of the antibiotic and I have found that I can precipitate the antibiotic as an insoluble metal salt from a clarified nutrient medium in which it is produced without the necessity of adsorbing the antibiotic on an anion exchange resin and eluting the antibiotic therefrom. When employing such a procedure, I filter the nutrient medium in which the antibiotic is produced and then clarify the same employing activated carbon, slurrying the carbon in the filtered nutrient medium and then filtering the activated carbon therefrom to give a partially purified aqueous solution of the antibiotic. I can precipitate the antibiotic from the clarified nutrient medium as an insoluble metal salt as described above.

Following precipitation of the cycloserine and removal of the insoluble metal salt from the supernatant, I then slurry the insoluble metal salt in water and add thereto a material capable of precipitating the metal ion as an insoluble salt thus liberating the cycloserine which goes into solution in the water present. For example, if I have precipitated the cycloserine as the silver salt, I can slurry the silver salt of cycloserine in water and add hydrochloric acid thereto. The silver precipitates as silver chloride while the cycloserine goes into aqueous solution in the free acid form. If enough hydrochloric acid is employed, the cycloserine can be converted to the hydrochloride at the same time that the silver is precipitated as silver chloride. In the same manner, hydrogen sulfide can be employed, the silver precipitating as silver sulfide and the cycloserine going into the water present. A combination of metal precipitating agents can be employed i. e. both hydrochloric acid and hydrogen sulfide can be used to insure complete removal of the silver. If the insoluble copper salt of cycloserine is slurried in water and hydrogen sulfide added, the copper will precipitate as copper sulfide and the cycloserine will go into solution in the water present. Similarly, mercury can be precipitated as the sulfide, and the other metals can be removed in a similar manner.

Following removal of the metal ion used in forming the insoluble metal salt of the antibiotic, the aqueous solution of the antibiotic is preferably decolorized if necessary and then freeze-dried under vacuum to obtain an amorphous preparation of very high purity. The amorphous form is suitable for most uses of the antibiotic material.

The antibiotic cycloserine can be crystallized from aqueous solution instead of obtained in the amorphous form. The material is crystallized by adding a water-miscible solvent to a purified aqueous solution of the antibiotic, the antibiotic material being insoluble or only slightly soluble in the water-miscible solvent. Suitable water-miscible solvents which can be employed to crystallize cycloserine from aqueous solution include acetone, methanol, dioxane, etc.

The following examples are offered to illustrate the recovery of cycloserine from impure aqueous solutions thereof. I do not intend to be limited to the specific materials or the procedures shown, but rather I intend for my invention to include all equivalents within the scope of this specification and the attached claims.

EXAMPLE I

A 76-gallon portion of nutrient medium in which cycloserine was produced and containing 4.8 units of cycloserine per ml. was filtered and passed through a column containing 10 liters of Dowex-2 (a strong basic anion exchange resin) in the OH− form at a flow rate of 1200 ml. per minute. The column was then washed with water and the cycloserine eluted from the resin with 0.2 N sulfuric acid at a rate of 1200 ml. per minute, the eluate being collected in 18 two-liter fractions. The pH of the eluate fractions was then adjusted to about 7.0 after which 1% by weight of decolorizing carbon was mixed with the eluate fraction and then filtered therefrom. To the decolorized eluate was then added 0.5 mg. of silver nitrate per unit of antibiotic activity contained in the eluate, the pH being maintained at 6.5 with sodium hydroxide. A crystalline silver derivative of cycloserine precipiated from the eluate and was filtered, washed with acetone and dried in vacuo. The following table gives the results for nine of the eluate fractions mentioned above.

Table I

| Eluate No. | Eluate, Vol./ml. | Potency, Units/ml. | Decolorized Filtrate, Vol./ml. | Potency, Units/ml. | $AgNO_3$, Grams | Prod., Grams | Potency, Units/mg. |
|---|---|---|---|---|---|---|---|
| 10 | 2,260 | 15 | 2,400 | 12 | 22.6 | 12.8 | 1.92 |
| 11 | 2,280 | 27 | | 21 | 24.0 | 24.4 | 1.23 |
| 12 | 2,180 | 34 | 2,340 | 31 | 35.0 | 33.9 | 1.80 |
| 13 | 2,020 | 47 | 2,120 | | 43.4 | 29.7 | 2.12 |
| 14 | 2,220 | 55 | 2,400 | | 53.3 | 38.2 | 2.5 |
| 15 | 2,160 | 32 | 2,465 | 28 | 36.7 | 29.4 | 2.4 |
| 16 | 2,130 | 25 | 2,370 | 20 | 28.8 | 24.4 | 2.0 |
| 17 | 2,050 | 17 | 2,220 | 13 | 22.6 | 21.8 | 1.18 |
| 18 | 1,960 | 11 | 2,100 | 8 | 12.7 | 10.4 | 0 |

A 10-gram portion of the crystalline silver derivative from eluate 14 shown in the table above was mixed with 60 ml. of water, and to this mixture was added 89 ml. of 0.5165 N hydrochloric acid. Silver chloride precipitated from the solution and was removed therefrom by filtration. The remaining solution was freeze-dried under vacuum to obtain 4.4 grams of solid, amorphous cycloserine assaying 5.15 units/mg.

EXAMPLE II

A 1-gram portion of the amorphous cycloserine obtained as described above in Example I was dissolved in 7.5 ml. of water and to this solution 5 ml. of acetone was added. Crystalline cycloserine precipitated from the solution after which an additional 5 ml. of acetone was added to insure complete crystallization. The crystals were filtered from the solution, and washed with acetone to give 0.6177 gram of air-dried crystals assaying 4.32 units/mg. and containing 14 percent moisture. Upon removal of the moisture by drying, the material assayed 5.02 units/mg.

EXAMPLE III

A 102 ml. portion of nutrient medium containing 5 units per ml. of cycloserine was mixed with 4% activated carbon, the mixture stirred and filtered. To the filtrate, 170 mg. of silver nitrate was added and the silver salt of cycloserine precipitated in the form of small white crystals. The crystals were filtered and dried to obtain 160 mg. of crystalline silver salt of cycloserine. The crystalline silver salt of cycloserine was then slurried with 10 ml. of water and 1.47 ml. of 0.505 N hydrochloric acid added. Silver chloride precipitated from the solution and was centrifuged therefrom. The remaining solution was treated with activated carbon and then freeze-dried under vacuum to obtain cycloserine hydrochloride assaying 4.85 units/mg.

EXAMPLE IV

A 100 ml. aqueous solution of cycloserine containing 88 units of cycloserine per ml. was mixed with 4.89 grams of copper sulphate, and the pH adjusted to 6.7 with sodium hydroxide. A precipitate of the copper salt of cycloserine formed and was filtered, washed with acetone and dried to obtain 3.92 grams of the copper salt of cycloserine assaying 1.88 units/mg. A 1-gram portion of the copper salt of cycloserine was suspended in 20 ml. of water and hydrogen sulfide bubbled through the suspension for five minutes. Insoluble copper sulfide precipitated from the solution and was filtered off, the filtrate being freeze-dried under vacuum to obtain 0.457 gram of cycloserine assaying 3.3 units per mg.

Now having described my invention, what I claim is:

1. A process for recovery of cycloserine from an impure aqueous solution thereof which comprises adding a water-soluble salt of a metal capable of forming a water-insoluble salt of cycloserine to an impure aqueous solution of cycloserine at a pH ranging from 5.5–9.0, removing the precipitated metal salt of cycloserine from the supernatant, slurrying the water-insoluble metal salt of cycloserine with water, adding to the slurry an acid having an anion capable of preferentially forming a water-insoluble salt with the metal cation of the water-insoluble metal salt of cycloserine, removing the precipitated water-insoluble metal salt, and recovering cycloserine from the purified aqueous solution thereof.

2. A process for recovery of cycloserine from an impure aqueous solution thereof which comprises adsorbing cycloserine from an impure aqueous solution thereof on a strong basic anion exchange in the OH⁻ form, eluting the cycloserine from the resin with an anion other than OH⁻, adding to the resulting aqueous eluate at a pH ranging from 5.5–9.0 a water-soluble salt of a metal capable of forming a water-insoluble salt of cycloserine, removing precipitated water-insoluble metal salt of cycloserine from the supernatant, slurrying the water-insoluble metal salt of cycloserine in water, adding to the slurry an acid having an anion capable of preferentially forming a water-insoluble salt with the metal cation of the water-insoluble metal salt of cycloserine, removing the precipitated water-insoluble metal salt and recovering cycloserine from the purified aqueous solution thereof.

3. A process for recovery of cycloserine from an impure aqueous solution thereof which comprises adding silver nitrate to an impure aqueous solution of cycloserine at a pH ranging from 5.5–9.0, removing precipitated silver salt of cycloserine from the supernatant, slurrying the silver salt of cycloserine in water, adding hydrochloric acid to the slurry, removing precipitated silver chloride from the solution, and recovering purified cycloserine from the resulting purified aqueous solution thereof.

4. A process for recovery of cycloserine from an impure aqueous solution thereof which comprises adding silver nitrate to an impure aqueous solution of cycloserine at a pH of about 6.5, removing precipitated silver salt of cycloserine from the supernatant, slurrying the silver salt of cycloserine with water, adding hydrochloric acid to the slurry, removing precipitated silver chloride from the solution, adding a water-miscible organic solvent which is a non-solvent for cycloserine to the purified aqueous solution of cycloserine, recovering cycloserine crystals which form.

5. A process for the recovery of cycloserine from an impure aqueous solution thereof which comprises adding a water-soluble copper salt to an impure aqueous solution of cycloserine at a pH ranging from 5.5–9.0, removing precipitated copper salt of cycloserine from the supernatant, slurrying the copper salt of cycloserine with water, adding hydrogen sulfide to the slurry, removing precipitated copper sulfide from the solution, recovering cycloserine from the resulting purified aqueous solution thereof.

6. A process for the recovery of cycloserine from an impure aqueous solution thereof which comprises adsorbing cycloserine from an impure aqueous solution thereof on a strong basic anion exchange resin in the OH⁻ form, removing the cycloserine from the resin by eluting with an anion other than OH⁻, adding a water-soluble silver salt to the aqueous eluate solution of cycloserine at a pH ranging from 5.5–9.0, removing precipitated silver salt of cycloserine from the supernatant, slurrying the silver salt of cycloserine in water, adding hydrochloric acid to the slurry, removing precipitated silver chloride from the solution, recovering cycloserine from the resulting purified aqueous solution thereof.

7. A process for the recovery of cycloserine from an impure aqueous solution thereof which comprises adsorbing the cycloserine from an impure aqueous solution thereof on a strong basic anion exchange resin in the OH⁻ form, eluting the cycloserine from the resin with an anion other than OH⁻, adding to the aqueous eluate solution of cycloserine a water-soluble silver salt at a pH of about 6.5, removing precipitated silver salt of cycloserine from the supernatant, slurrying the silver salt of cycloserine with water, adding hydrochloric acid to the slurry, removing precipitated silver chloride from the resulting solution adding a water-miscible organic solvent which is a non-solvent for cycloserine to the purified aqueous solution of cycloserine and removing crystalline cycloserine which forms.

8. A process for the recovery of cycloserine from an impure aqueous solution thereof which comprises adding a water-soluble salt of a metal capable of forming a water-insoluble salt of cycloserine to an impure aqueous solution of cycloserine at a pH ranging from about 5.5–9.0, removing the precipitated metal salt of cycloserine from the supernatant, slurrying the water-insoluble metal salt of cycloserine with water, adding to the slurry an acid having an anion capable of preferentially forming a water-insoluble salt with the metal cation of the water-insoluble metal salt of cycloserine, removing the precipitated water-insoluble metal salt from the remaining aqueous solution of cycloserine, freeze drying under vacuum the purified aqueous solution of cycloserine to obtain solid amorphous cycloserine.

References Cited in the file of this patent

UNITED STATES PATENTS

| Number | Name | Date |
| --- | --- | --- |
| 2,443,485 | Waksman | June 15, 1948 |
| 2,501,014 | Wintersteiner et al. | Mar. 21, 1950 |
| 2,546,297 | Kuehl et al. | Mar. 27, 1951 |
| 2,571,674 | Butturini et al. | Oct. 16, 1951 |
| 2,640,842 | Weidenheimer et al. | June 2, 1953 |
| 2,667,441 | Nager | Jan. 26, 1954 |

FOREIGN PATENTS

| Number | Country | Date |
| --- | --- | --- |
| 371,550 | Great Britain | Apr. 28, 1932 |
| 715,362 | Great Britain | Sept. 15, 1954 |

OTHER REFERENCES

Swart et al.: Archives Biochem., vol. 24, Nov. 1949, pp. 97, 98 and 99.

Abraham et al.: British J. of Exp. Pathol., 1942, p. 108.